United States Patent
Iijima et al.

(10) Patent No.: US 10,075,631 B2
(45) Date of Patent: Sep. 11, 2018

(54) IMAGING APPARATUS, IMAGING METHOD AND RECORDING MEDIUM HAVING PROGRAM FOR PERFORMING SELF-TIMER SHOOTING

(71) Applicant: CASIO COMPUTER CO., LTD., Shibuya-ku, Tokyo (JP)

(72) Inventors: Jun Iijima, Tokorozawa (JP); Junichi Miyasaka, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 25 days.

(21) Appl. No.: 14/610,794

(22) Filed: Jan. 30, 2015

(65) Prior Publication Data
US 2015/0271394 A1    Sep. 24, 2015

(30) Foreign Application Priority Data

Mar. 19, 2014    (JP) .................................. 2014-056487

(51) Int. Cl.
*H04N 5/232*    (2006.01)

(52) U.S. Cl.
CPC ..... *H04N 5/23222* (2013.01); *H04N 5/23203* (2013.01)

(58) Field of Classification Search
CPC ........... H04N 5/23222; H04N 5/23203; H04N 5/23293; H04N 5/23219
See application file for complete search history.

(56) References Cited

U.S. PATENT DOCUMENTS

| | | | |
|---|---|---|---|
| 2004/0001708 A1* | 1/2004 | Hatori | H04N 1/00196 396/310 |
| 2004/0024031 A1* | 2/2004 | Morissette | A61K 31/427 514/365 |
| 2004/0097261 A1* | 5/2004 | Ujii | H04M 19/041 455/556.1 |

(Continued)

FOREIGN PATENT DOCUMENTS

| | | |
|---|---|---|
| JP | 06051387 A | 2/1994 |
| JP | 07009146 Y2 | 3/1995 |

(Continued)

OTHER PUBLICATIONS

Japanese Office Action (and English translation thereof) dated Jul. 7, 2015, issued in counterpart Japanese Application No. 2014-056487.

*Primary Examiner* — Roberto Velez
*Assistant Examiner* — Tuan Le
(74) *Attorney, Agent, or Firm* — Holtz, Holtz & Volek PC

(57) ABSTRACT

An imaging apparatus which can take shots sequentially by self-timer. The imaging apparatus, in response to input of a user's start operation to perform self-timer shooting, plays back a first voice file including a voice of a predetermined playback time period one time, the first voice file including a voice providing guidance to prepare for shooting, determines whether the first voice file has been played back to completion one time, and performs shooting one time when it is determined that the first voice file has been played back to completion one time, without performing a time-check function. The imaging apparatus repeats playback of the first voice file and performs shooting a predetermined number of times.

21 Claims, 16 Drawing Sheets

(56) References Cited

U.S. PATENT DOCUMENTS

| | | | | |
|---|---|---|---|---|
| 2004/0246342 A1* | 12/2004 | Kim | ................ | H04N 5/232 |
| | | | | 348/207.99 |
| 2006/0024031 A1* | 2/2006 | Taira | ................ | G11B 27/322 |
| | | | | 386/232 |
| 2012/0320149 A1* | 12/2012 | Kim | ................ | H04N 5/23238 |
| | | | | 348/36 |
| 2012/0328152 A1* | 12/2012 | Bamba | ................ | G06T 3/0062 |
| | | | | 382/103 |
| 2014/0122513 A1* | 5/2014 | Julia | ................ | G06F 17/30746 |
| | | | | 707/758 |
| 2014/0192217 A1* | 7/2014 | Kim | ................ | H04N 5/23293 |
| | | | | 348/222.1 |
| 2015/0189180 A1* | 7/2015 | Sudo | ................ | H04N 5/23245 |
| | | | | 348/222.1 |

FOREIGN PATENT DOCUMENTS

| | | | |
|---|---|---|---|
| JP | 2001117155 | A | 4/2001 |
| JP | 2001257911 | A | 9/2001 |
| JP | 2002237986 | A | 8/2002 |
| JP | 2004357018 | A | 12/2004 |
| JP | 2005221578 | A | 8/2005 |
| JP | 2010074517 | A | 4/2010 |

\* cited by examiner

FIG. 3

<SUBJECT TABLE>

| IDENTIFIED SUBJECT | NO. OF SHOTS |
|---|---|
| CHILD | 10 |
| HUMAN OTHER THAN CHILD | 5 |
| OTHER THAN HUMAN | 3 |

FIG. 4
<GUIDE MARK>
A POSE IS NOT REGARDED
TO MATCH THE GUIDE MARK.
A POSE IS REGARDED
TO MATCH THE GUIDE MARK.
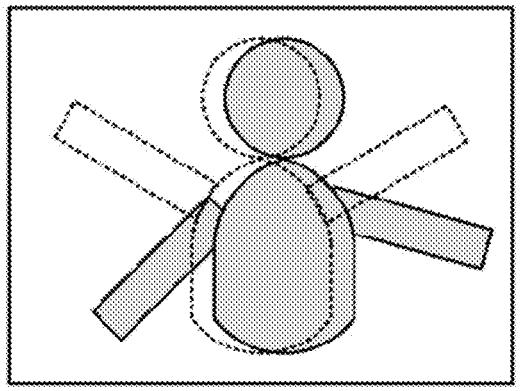
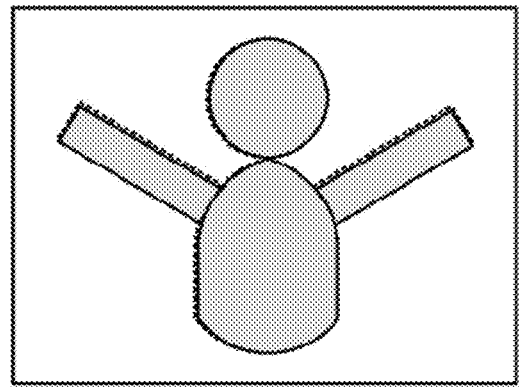

FIG. 5

<GUIDE VOICE TABLE>

| CONDITION | GUIDE VOICE FILE | GUIDE MARK DATA | NAME | PLAYBACK TIME |
|---|---|---|---|---|
| FOR 1ST SHOT A WITH GUIDE MARK (COMMON TO ALL SHOOTS) | | | | |
| FOR 2ND SHOT A | | | — | |
| FOR 3RD SHOT A | | | — | |
| ... | | | — | |
| FOR 1ST SHOT B WITHOUT GUIDE MARK (COMMON TO ALL SHOOTS) | | — | | |
| FOR 2ND SHOT B | | — | — | |
| FOR 3RD SHOT B | | — | — | |
| ... | ... | ... | ... | ... |
| DEGREE OF SMILE UP 1 | | — | — | |
| DEGREE OF SMILE UP 2 | | — | — | |
| FOR CRYING FACE | | — | ... | |
| ONLY COMMON TO ALL SHOOTS A WITHOUT GUIDE MARK | ... | — | ... | ... |
| FOR 1ST SHOT WITHOUT USER-MADE GUIDE MARK (COMMON TO ALL SHOOTS) | | — | | |
| USER-MADE FOR 2ND SHOT | | — | — | |
| USER-MADE FOR 3RD SHOT | | — | — | |
| ... | | ... | ... | |

FIG. 13

<CHANGE RATE TABLE>

| IDENTIFICATION CATEGORY | ADDITIONAL POINT OF NO. OF SHOTS | | |
|---|---|---|---|
| | 1 | 2 | 3 |
| RATIO OF AREA OF FACE TO AREA OF CAPTURED IMAGE [%] | ~r1 | r1~r2 | r2~ |
| PART OF HUMAN | FACE | UPPER BODY | WHOLE BODY |
| NO. OF PERSONS | ONE | TWO | THREE~ |

IN THE CASE OF DETERMINATION BY HUMAN DETECTION, THE NUMBER OF SHOTS IS DETERMINED BY THE TOTAL SUM OF ADDITIONAL POINTS IN EACH IDENTIFICATION CATEGORY OF THE CHANGE RATE TABLE.

<COMPLEXITY TABLE>

| IDENTIFICATION CATEGORY | ADDITIONAL POINT OF NO. OF SHOTS | | |
|---|---|---|---|
| | 1 | 2 | 3 |
| TOTAL SUM OF LENGTH OF CONTOURS [pixels] | ~s1 | s1~s2 | s2~ |
| NO. OF CONTOURS CONTINUING FOR LENGTH a OR LONGER [piece] | ~t1 | t1~t2 | t2~ |
| RATIO OF CONTOURS OF WHICH CURVATURE IS b OR LARGER [%] | ~u1 | u1~u2 | u2~ |

IN THE CASE OF DETERMINATION BY CONTOUR EXTRACTION, THE NUMBER OF SHOTS IS DETERMINED BY THE TOTAL SUM OF ADDITIONAL POINTS IN EACH IDENTIFICATION CATEGORY OF THE COMPLEXITY TABLE.

IMAGING APPARATUS, IMAGING METHOD AND RECORDING MEDIUM HAVING PROGRAM FOR PERFORMING SELF-TIMER SHOOTING

CROSS-REFERENCE TO RELATED APPLICATIONS

This application is based upon and claims the benefit of priority under 35 USC 119 of Japanese Patent Application No. 2014-056487 filed on Mar. 19, 2014, the entire disclosure of which is incorporated herein by reference in its entirety for all purposes.

BACKGROUND OF THE INVENTION

1. Field of the Invention

The present invention relates to an imaging apparatus, an imaging method and a computer readable recording medium for recording a program thereon for performing self-timer shooting.

2. Description of the Related Art

Conventionally, there has been known a function to successively take pictures at regular timings set by a timer. For example, Japanese Patent Application Laid-Open Publication No. 2002-237986 published on Aug. 23, 2002, discloses a technology for enabling a user to set a timer within a predetermined range.

SUMMARY OF THE INVENTION

According to the first aspect of the present invention, an imaging apparatus for performing shooting by self-timer is provided. The imaging apparatus includes an output device, an imaging device, and a processor which executes a program stored in a memory to execute: playback processing to control the output device to play back a first voice file of a predetermined playback time period one time, the first voice file including a voice providing guidance to prepare for shooting, determining processing to determine whether the output device has played back the first voice file to completion one time, and shooting processing to control the imaging device to perform shooting one time when the determining processing determines that the output device has played back the first voice file to completion one time. According to the first aspect of the present invention, the processor starts to execute the playback processing in response to input of a user's start operation to perform self-timer shooting, the processor executes the shooting processing when the first voice file has been played back to completion one time, without performing a time-check function, and the processor (i) executes the playback processing to control the output device to play back the first voice file one time again in response to the output device having played back the first voice file to completion one time, (ii) executes the determining processing to determine whether the output device has played back the first voice file to completion one time again, and (iii) executes the shooting processing to control the imaging device to perform shooting one time again when the determining processing determines that the output device has played back the first voice file to completion one time again.

According to the second aspect of the present invention, an imaging method performed by an imaging apparatus for performing shooting by self-timer is provided. The imaging method comprises, in response to input of a user's start operation to perform self-timer shooting, playing back a first voice file of a predetermined playback time period one time, the first voice file including a voice providing guidance to prepare for shooting, determining whether the first voice file has been played back to completion one time, performing shooting one time when it is determined that the first voice file has been played back to completion one time, without performing a time-check function, playing back the first voice file one time again in response to the first voice file having been played back to completion one time, determining whether the first voice file has been played back to completion one time again, and performing shooting one time again when it is determined that the first voice file has been played back to completion one time again.

According to the third aspect of the present invention, a non-transitory computer-readable recording medium having a program stored thereon that is readable by a computer controlling an imaging apparatus for performing shooting by self-timer is provided. The program controls the computer to perform functions including, in response to input of a user's start operation to perform self-timer shooting, playing back a first voice file of a predetermined playback time period one time, the first voice file including a voice providing guidance to prepare for shooting, determining whether the first voice file has been played back to completion one time, performing shooting one time when it is determined that the first voice file has been played back to completion one time, without performing a time-check function, playing back the first voice file one time again in response to the first voice file having been played back to completion one time, determining whether the first voice file has been played back to completion one time again, and performing shooting one time again when it is determined that the first voice file has been played back to completion one time again.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are, however, exclusively for explanation and do not limit the scope of the present invention.

Here:

FIG. 3 shows a subject table stored in a shoot setting information storage unit.

FIG. 4 is a schematic diagram for showing an example of guide mark data stored in a guide information storage unit.

FIG. 5 shows a guide voice table stored in the guide information storage unit.

FIG. 13 shows a change rate table and a complexity table.

DETAILED DESCRIPTION OF THE PREFERRED EMBODIMENT

Hereinafter, embodiments of the present invention will be described with reference to the accompanying drawings.

Figure 1:
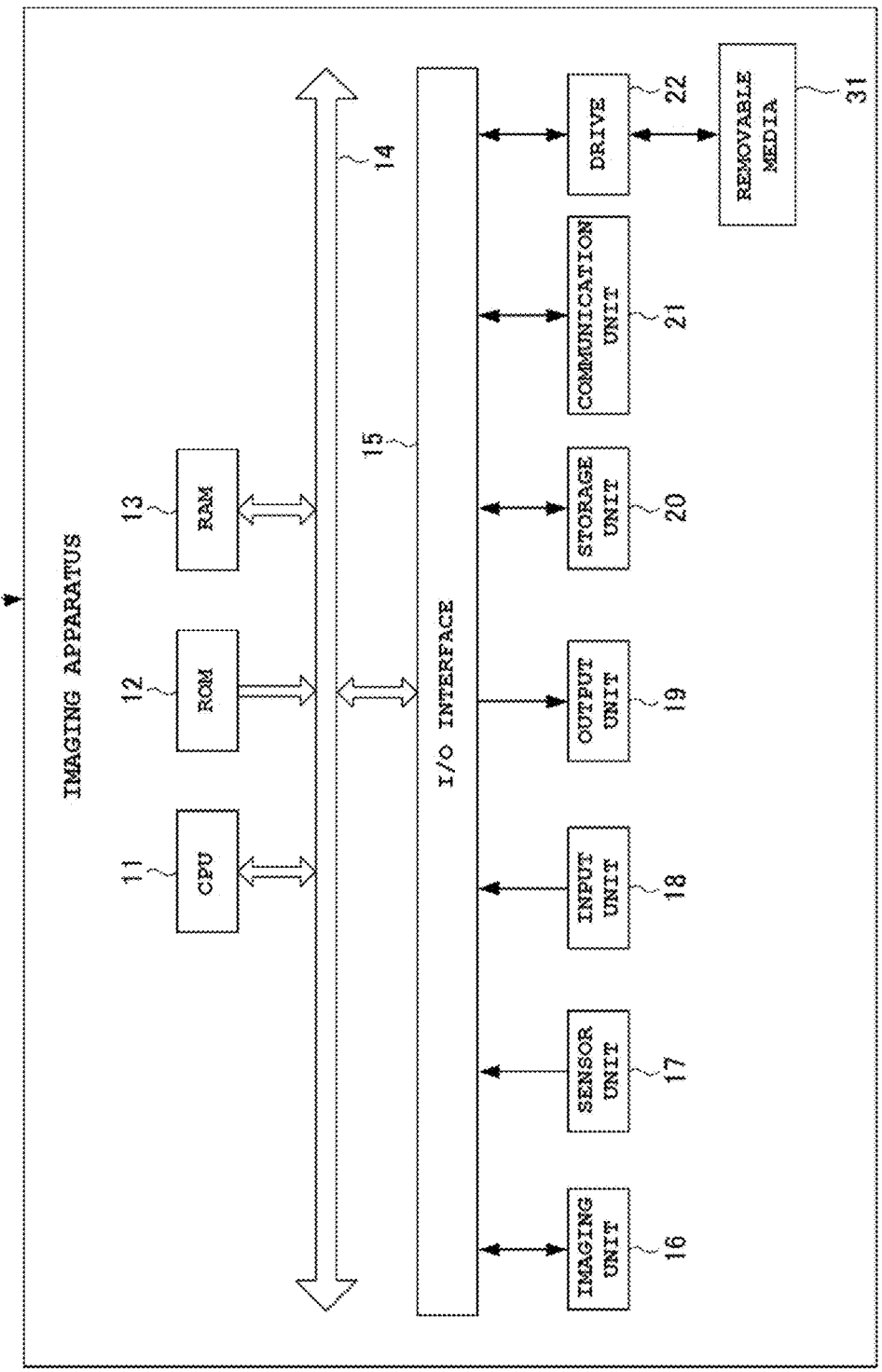
FIG. 1 is a block diagram showing a hardware configuration of an imaging apparatus according to a first embodiment of the present invention.

FIG. 1 is a block diagram showing a hardware configuration of an imaging apparatus according to one embodiment of the present invention.

For example, the imaging apparatus 1 is realized by a digital camera.

The imaging apparatus 1 includes a CPU (Central Processing Unit) 11, a ROM (Read Only Memory) 12, a RAM (Random Access Memory) 13, a bus 14, an I/O interface 15, an imaging unit 16, a sensor unit 17, an input unit 18, an output unit 19, a storage unit 20, a communication unit 21, and a drive 22.

The CPU 11 performs various processes in accordance with programs stored in the ROM 12 or loaded in the RAM 13 from the storage unit 20.

In the RAM 13, there are stored data necessary for the CPU 11 to execute various processes, and the like.

The CPU 11, the ROM 12 and the RAM 13 are connected to each other via the bus 14. The I/O interface 15 is also connected to the bus 14. The imaging unit 16, the sensor unit 17, the input unit 18, the output unit 19, the storage unit 20, the communication unit 21, and the drive 22 are connected to the I/O interface 15.

The imaging unit 16 includes an optical lens unit and an image sensor (not shown in the drawing).

The optical lens unit includes lenses for collecting light to photograph a subject, for example, a focus lens, a zoom lens, and the like.

The focus lens forms an image of a subject on a light-receiving surface of the image sensor. The zoom lens freely changes the focal length within a predetermined range.

Further, the optical lens unit is provided with a peripheral circuit for adjusting setting parameters such as focusing, exposure, white balancing, and the like, as necessary.

The image sensor includes a photoelectric conversion element, an AFE (Analog Front End), and the like.

The photoelectric conversion element includes a CMOS (Complementary Metal Oxide Semiconductor) type photoelectric conversion element, for example. A subject's image is input to the photoelectric conversion element from the optical lens unit. The photoelectric conversion element performs photoelectric conversion (image capturing) of the subject's image and accumulates image signals for a predetermined period of time. The photoelectric conversion element provides the AFE with the accumulated image signals sequentially.

The AFE performs various signal processing operations such as A/D (Analog/Digital) conversion on the analog image signals. Digital signals are generated by the signal processing operations and output as output signals of the imaging unit 16.

The output signals of the imaging unit 16 are hereinafter referred to as a "captured image". The captured image is supplied to the CPU 11 or other units.

The sensor unit 17 measures a relative position or angle of the imaging apparatus 1. In the present embodiment, the sensor unit 17 includes various sensors such as a three-axis acceleration sensor.

The input unit 18 includes a microphone and/or various buttons and a variety of information is input via the input unit 18 in response to a user's operations.

The output unit 19 includes a display device, a speaker, or the like, and outputs images or voices.

The storage unit 20 includes a hard disk, a DRAM (Dynamic Random Access Memory), or the like and various image data is stored in the storage unit 20.

The communication unit 21 controls communication with different devices (not shown in the drawing) via a network such as Internet.

A removable media 31 including a magnetic disk, an optical disk, a magneto-optical disc, a semiconductor memory, or the like, is mounted on the drive 22. A program read out from the removable media 31 by the drive 22 is installed in the storage unit 20 as necessary. Similarly to the storage unit 20, the removable media 31 stores various data such as the image data stored in the storage unit 20.

The imaging apparatus 1 configured as described above has a selfie function by which a user takes self-portraits by turning the imaging apparatus 1 toward oneself. The imaging apparatus 1 according to the present embodiment performs self-timer shooting to take photographs sequentially at predetermined intervals and outputs a guide voice or displays a guide mark to prompt the user to prepare for shooting prior to performing the shooting.

Further, the imaging apparatus 1 according to the present embodiment has a function of generating a moving picture by using a plurality of images taken.

In the present embodiment, the imaging apparatus 1 has a posing shot function. The posing shot function as used herein means a function of taking five photographs at intervals while providing voice guidance by a single shooting operation. By this, the user can concentrate on making a specific facial expression or a pose during taking selfies because the user does not need to push a shutter button for every shot. Further, as five photographs can be taken successively by a single shooting operation, the user does not need to push the shutter button five times. In addition, since an interval between shoots can be perceived by the voice guidance, the user can easily estimate timing for making a specific facial expression or a pose.

Figure 2:
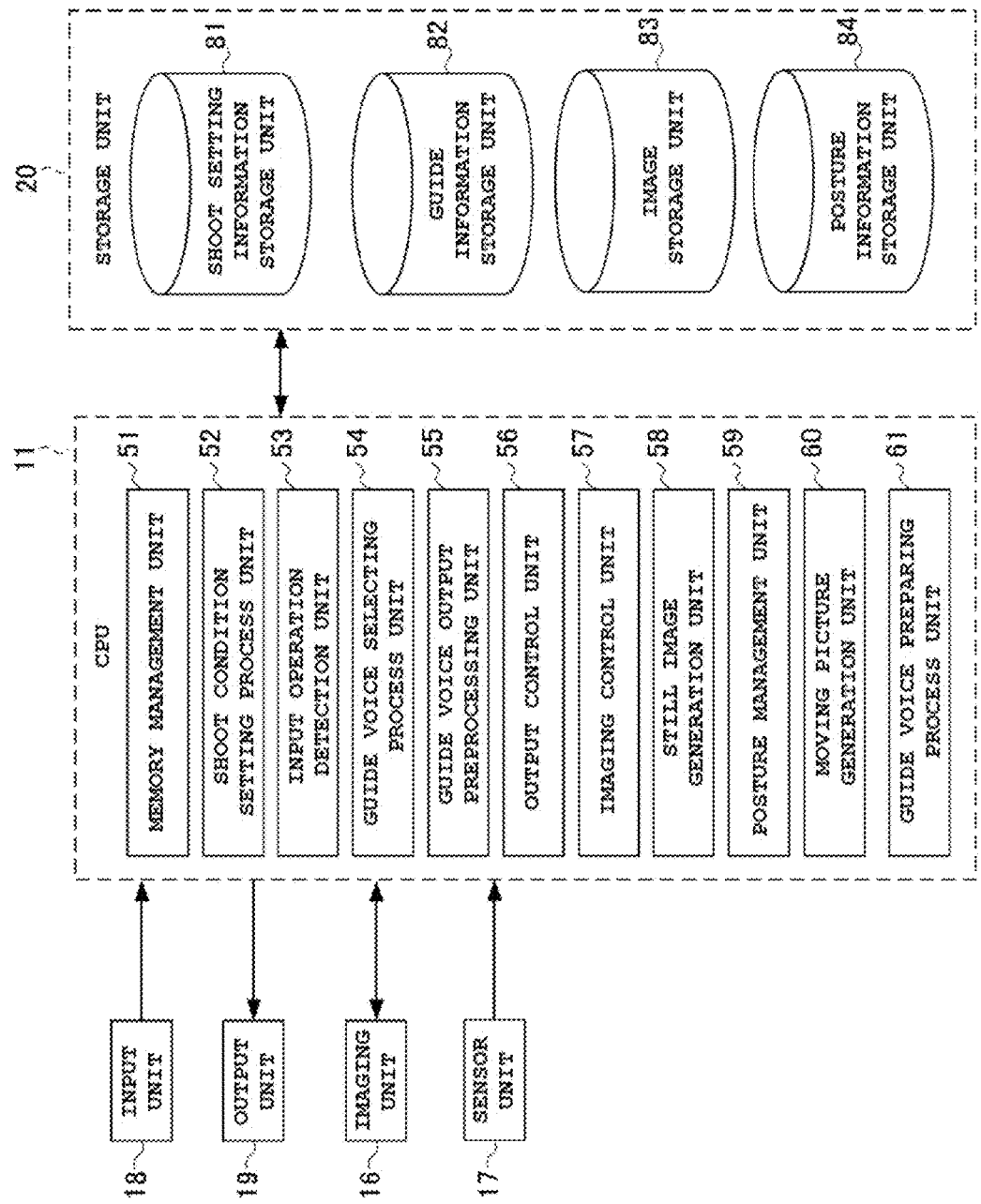
FIG. 2 is a functional block diagram showing a functional configuration of the imaging apparatus of FIG. 1 for performing a self-timer shooting process and a guide voice preparing process.

FIG. 2 is a functional block diagram showing a functional configuration of the imaging apparatus of FIG. 1 for performing a self-timer shooting process and a guide voice preparing process.

The self-timer shooting process as used herein means a series of processes performed from multiple shoots controlled by self-timer to generation of a moving picture using multiple images taken.

Further, the self-timer shooting process includes various processes such as a shoot condition setting process for setting shoot conditions, a guide voice selecting process for selecting a guide voice, a guide voice output process for outputting a guide voice while images are taken, and a moving picture generating process for generating a moving picture using the taken images.

The guide voice preparing process will be described later.

In the case of executing the self-timer shooting process, a memory management unit 51, a shoot condition setting process unit 52, an input operation detection unit 53, a guide voice selecting process unit 54, a guide voice output preprocessing unit 55, an output control unit 56, an imaging control unit 57, a still image generation unit 58, a posture management unit 59, and a moving picture generation unit 60 of the CPU 11 function, as shown in FIG. 2.

Further, in an area of the storage unit 20, a shoot setting information storage unit 81, a guide information storage unit 82, an image storage unit 83, and a posture information storage unit 84 are configured.

In the shoot setting information storage unit 81, shoot setting information such as a subject table to which is referred in order to set the number of shots is stored.

FIG. 3 shows a subject table stored in the shoot setting information storage unit 81.

The subject table is used to set the number of shots and subjects detected from captured images on the occasion of setting the number of shots correspond to numbers of shots in the subject table as shown in FIG. 3. According to the subject table, the number of shots is larger in the case that an object to be shot goes through a lot of changes. More specifically, in the case that an object to be shot is a human who actively moves (a child), the number of shots is set to the largest number, and in the case that the object to be shot is not a human and its movement is small (for example, a landscape), the number of shots is set to the smallest number.

Returning to FIG. 2, guide information such as a guide voice file, guide mark data, and a guide voice table is stored in the guide information storage unit 82.

The guide voice file includes a voice recorded by a user and/or a voice relating to shooting (for example, "three, two, one", "start", and "OK!").

FIG. 4 is a schematic diagram for showing an example of the guide mark data stored in the guide information storage unit 82.

The guide mark data is an image translucently displayed so as to be superimposed on a live view image and an object to be shot uses it as a trigger for shooting by adopting a pose which is the same as the displayed image while looking at the live view image. In the example of FIG. 4, guide mark data showing a shape of a human raising his arms is displayed transmissively on a live view image in the center of the image (displayed in a broken line in FIG. 4). The object to be shot adopts a pose so that the pose matches a guide mark image displayed according to the guide mark data while looking at the guide mark image and shooting is performed in the case that the pose matches the guide mark image. In this example, it is regarded that a pose of the object to be shot matches the guide mark image in the case that the pose corresponds to the guide mark image to a predetermined degree.

FIG. 5 shows the guide voice table stored in the guide information storage unit 82.

In the guide voice table as shown in FIG. 5, various conditions correspond to guide voice files, guide mark data, names and playback time.

The correspondence of the guide voice table conforms to predetermined rules. For example, it is supposed that a name can correspond to the first shot (common to all shoots). Some conditions correspond to guide marks and some do not. Further, there may be only one condition common to all shots and, in this case, no guide mark corresponds to the condition. No guide mark corresponds to a guide voice file prepared by a user. It is further supposed that no guide mark corresponds to voice guidance which is selected and played back properly in accordance with a captured image. As the voice guidance is available only for automatic selection, it has no name and cannot be selected by the user.

Returning to FIG. 2, various types of image data such as a still image file or a moving picture file is stored in the image storage unit 83.

In the posture information storage unit 84, information on posture of the imaging apparatus 1 such as its location and/or angle acquired from the sensor unit 17 is stored.

The memory management unit 51 acquires a residual memory capacity of the storage unit 20 as its storable capacity and determines whether or not the residual memory capacity is larger than a predetermined amount corresponding to a predetermined number of images to be shot.

The shoot condition setting process unit 52 executes the shoot condition setting process.

The shoot condition setting process is a process of detecting a subject in a captured image, setting the number of shots in accordance with the detected subject, and/or setting an image size based on the set number of shots and the residual memory capacity.

In the present embodiment, the number of shots is determined according to whether or not the subject is a human and, in the case that the subject is a human, whether or not the human is a child.

More specifically, the shoot condition setting process unit 52 sets the number of shots by referring to the subject table shown in FIG. 3 based on the result of the detection of a subject in a captured image.

Further, the number of shots is set to a small number in the case that the residual memory capacity is small.

Furthermore, the image size is set to a small value in the case that the residual memory capacity is small.

The input operation detection unit 53 detects various operations such as an operation to start a shoot input to the input unit 18.

The guide voice selecting process unit 54 executes the guide voice selecting process.

The guide voice selecting process is a process of selecting a guide voice to be used, selecting whether or not to change a guide voice for every shoot, and/or changing guide voices according to how many shots have been taken in the case of changing guide voices for every shoot.

More specifically, the guide voice selecting process unit 54 changes a voice files (guide voices) to use, determines whether or not to use one voice for all shoots, and/or changes a guide voice according to how many shots have been taken based on user settings.

The guide voice output preprocessing unit 55 executes guide voice output preprocessing.

The guide voice output preprocessing as used herein means a series of operations performed to output a guide voice.

More specifically, the guide voice output preprocessing includes operations performed to reach a state of outputting a guide voice in the case that a pose of the subject matches a guide mark and/or in the case that there is no change in the position of the imaging apparatus and in captured images.

Further, in the guide voice output preprocessing according to the present embodiment, it is prohibited to perform shooting from the same shooting locations and angles. The guide voice output preprocessing according to the present embodiment is configured to display a message showing that a duplicated shot will be taken (hereinafter, referred to as a "duplicated shoot message") in order to call the user's attention and to output no guide voice in the case the present shooting location and angle are the same as those of previous shooting.

More specifically, the guide voice output preprocessing unit 55 changes whether or not to display a translucent mark (a guide mark) according to user settings.

Further, the guide voice output preprocessing unit 55 changes guide marks stored so as to correspond to voice files according to a selected voice file. In this case, in order to detect whether or not a subject matches a guide mark, the guide voice output preprocessing unit 55 detects a moving body (the subject) by comparing images successively captured and determines that the detected subject is not moving in the case that the subject's position is regarded as being constant for a predetermined time period (for example, one second). The guide voice output preprocessing unit 55 determines that the detected subject matches the guide mark in the case that the subject is regarded to match the guide mark for a predetermined time period (for example, one second).

Further, in order to determine whether or not the imaging apparatus 1 stands still, the guide voice output preprocessing unit 55 detects movement of a main body of the imaging apparatus 1 by angle detection means included in the imaging apparatus 1 and determines that the imaging apparatus stands still in the case that the shooting location and angle of the imaging apparatus are regarded as being the same for a predetermined time period (for example, one second). In the case that movement of the imaging apparatus is larger than a threshold value, it is regarded that shooting is performed at a different location and/or a different angle. The guide voice output preprocessing unit 55 acquires a location and an angle of the imaging apparatus when detecting that the movement stops, compares them with shooting locations and angles stored for previously performed shoots and displays a message showing that a duplicated shot will be taken in the case that it is determined by the comparison that the location and angle are the same as the previous ones.

The output control unit 56 controls the output unit 19 to play back a guide voice stored in the guide information storage unit 82 based on the selection performed by the guide voice selecting process.

The imaging control unit 57 controls the imaging unit 16. More specifically, the imaging control unit 57 controls the imaging unit 16 to perform half-shutter processing (AE, AF, AWB) and controls the imaging unit 16 based on the set shoot conditions. Further, the imaging control unit 57 controls the imaging unit 16 to output captured images for detection of a subject and check of a shooting location.

The still image generation unit 58 generates a still image file based on the output from the imaging unit 16. Then, the still image generation unit 58 allows the generated still image file in the image storage unit 83.

The posture management unit 59 manages information on a location and/or an angle of the imaging apparatus 1 based on outputs from the sensor unit 17. The posture management unit 59 allows the information on the location and/or the angle of the imaging apparatus 1 acquired by the sensor unit 17 to be stored in the posture information storage unit 84 as posture information.

The moving picture generation unit 60 generates a moving picture file by using a plurality of still image files stored in the image storage unit 83. In the present embodiment, the moving picture generation unit 60 generates a moving picture file in which the acquired still image files are displayed in time series at a predetermined interval. The present embodiment is configured to generate a moving picture file from files including a plurality of still images sequentially taken and leave the still image files.

Figure 6:
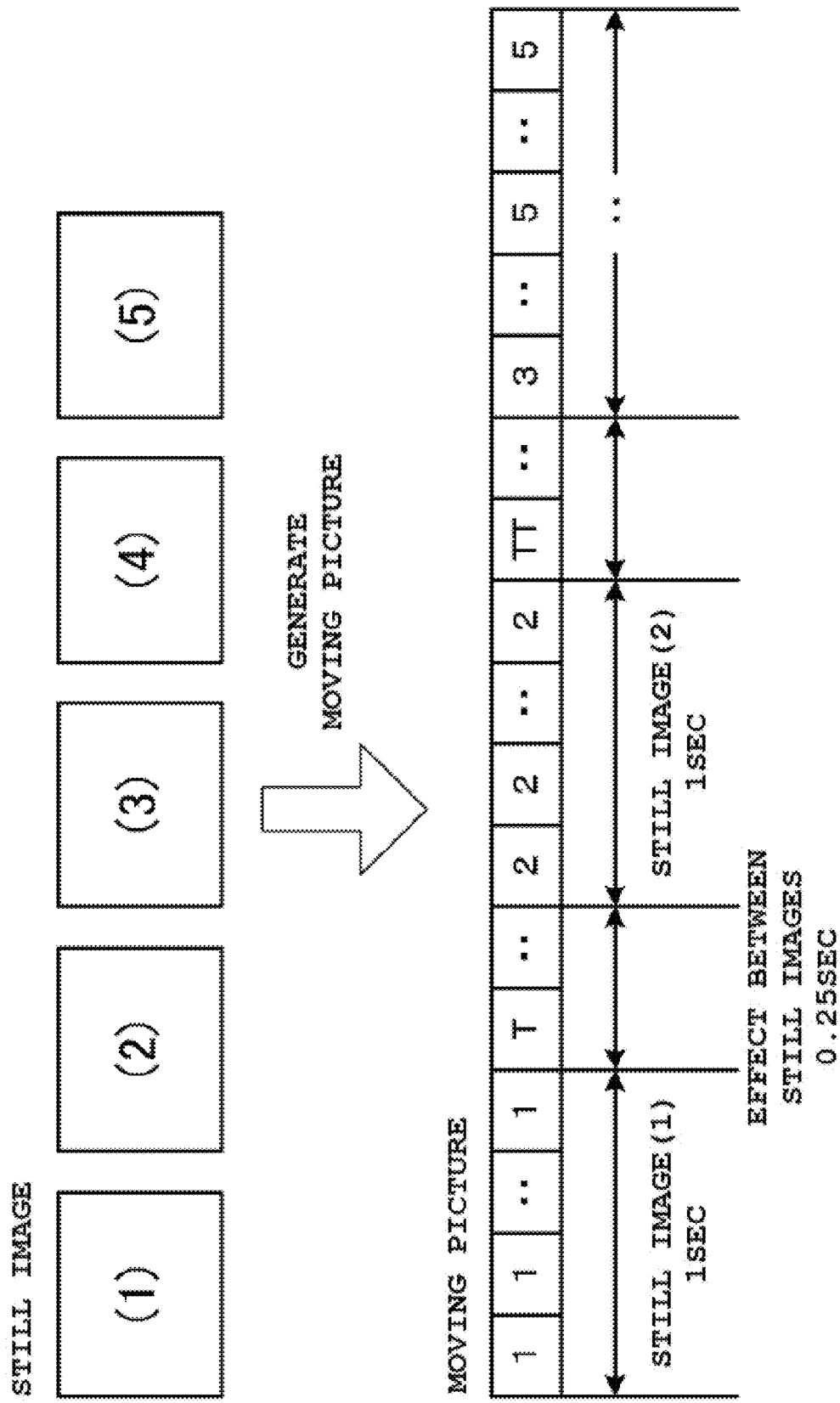
FIG. 6 is a schematic diagram for showing an example of generation of a moving picture file according to the embodiment.

FIG. 6 is a schematic diagram for showing an example of generation of a moving picture file according to the embodiment.

In the present embodiment, in the case that five still image files are acquired as shown in the example of FIG. 6, a moving picture of total six seconds is generated in which a still image included in each still image file is displayed for a predetermined time period (one second in the present embodiment) and an effect, for example, a transition effect such as a wipe effect, occurs between two still image files for a predetermined time period (0.25 second in the present embodiment).

As shown in FIG. 2, a guide voice preparing process unit 61 of the CPU 11 functions to execute the guide voice preparing process.

The guide voice preparing process unit 61 executes the guide voice preparing process.

The guide voice preparing process as used herein means a series of processes performed to modify an input voice for voice guidance to make a guide voice. The guide voice preparing process performs modification of detecting sound parts from the input voice and adding a silent part of a predetermined length of time to the sound parts to prepare a guide voice.

More specifically, the guide voice preparing process unit 61 makes a voice file by adding a silent part of a predetermined of time period (for example, one second) after a point of time when a recorded voice is cutoff in order to prevent release from being performed immediately after the sound is cut off.

Further, the guide voice preparing process unit 61 allows the user to input a name arbitrarily.

Figure 7:
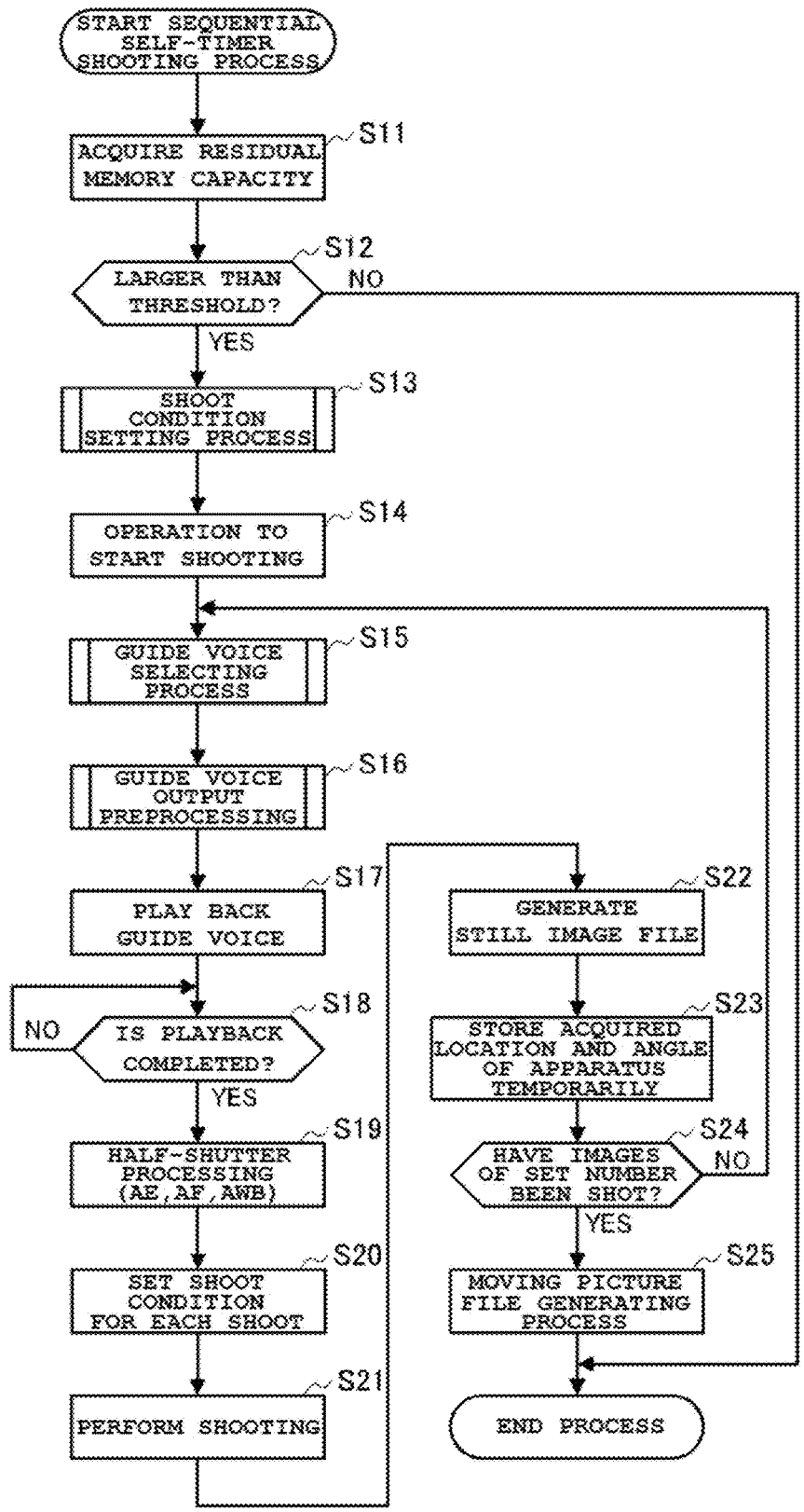
FIG. 7 is a flow chart for explaining a sequential self-timer shooting process performed by the imaging apparatus of FIG. 1 including the functional configuration shown in FIG. 2.

FIG. 7 is a flow chart for explaining a sequential self-timer shooting process performed by the imaging apparatus 1 of FIG. 1 including the functional configuration shown in FIG. 2.

The sequential self-timer shooting process is started by the user's operation of starting the sequential self-timer shooting process input to the input unit 18.

At Step S11, the memory management unit 51 acquires a residual memory capacity. More specifically, the memory management unit 51 acquires a residual memory capacity of the storage unit 20 as its storable capacity.

At Step S12, the memory management unit 51 determines whether or not the residual memory capacity is larger than a threshold. More specifically, the memory management unit 51 determines whether or not the residual memory capacity is larger than a predetermined memory capacity, for example, corresponding to data of five images to be shot sequentially.

In the case that the residual memory capacity is not larger than the threshold, the determination at Step S12 is "NO" and the sequential self-timer shooting process is ended.

In the case that the residual memory capacity is larger than the threshold, the determination at Step S12 is "YES" and the process proceeds to Step S13.

At Step S13, the shoot condition setting process unit 52 executes the shoot condition setting process. As a result, shoot conditions (for example, the number of shots and/or image size) are set. The shoot condition setting process will be explained in detail in the following.

At Step S14, the input operation detection unit 53 detects an operation to start shooting input to the input unit 18.

At Step S15, the guide voice selecting process unit 54 executes the guide voice selecting process. As a result, a guide voice is selected to be output to provide guidance on shooting. The guide voice selecting process will be explained in detail in the following.

At Step S16, the guide voice output preprocessing unit 55 executes the guide voice output preprocessing. As a result, a guide mark is displayed and/or other operations necessary to output a guide voice are performed. The guide voice output preprocessing will be explained in detail in the following.

At Step S17, the output control unit 56 controls the output unit 19 to output a guide voice stored in the guide information storage unit 82 based on the selection performed by the guide voice selecting process. As a result, the guide voice based on the selection is played back by the output unit 19.

At Step S18, the output control unit 56 determines whether or not the output unit 19 completes the playback.

In the case that the playback is not completed, the determination at Step S18 is "NO" and the process stands by until the playback is not completed.

In the case that the playback is completed, the determination at Step S18 is "YES" and the process proceeds to Step S19.

At Step S19, the imaging control unit 57 controls the imaging unit 16 to perform half-shutter processing (AE, AF, AWB).

At Step S20, the imaging control unit 57 sets shoot conditions for each shoot based on the image size set by the shoot condition setting process at Step S13 based on the residual memory capacity and the values of AE, AF, and AWB acquired at Step S19.

At Step S21, the imaging control unit 57 controls the imaging unit 16 to perform shooting in accordance with the set shoot conditions.

As Step S22, the still image generation unit 58 generates a still image file based on the output from the imaging unit 16. Then, the still image generation unit 58 allows the still image file to be stored in the image storage unit 83.

At Step S23, the posture management unit 59 allows the present location and angle of the imaging apparatus 1 acquired by the sensor unit 17 (a location and an angle of the imaging apparatus 1 at the time of acquisition) to be temporarily stored in the posture information storage unit 84.

At Step S24, the imaging control unit 57 determines whether or not images of the number set by the shoot condition setting process at Step S13 have been shot.

In the case that images of the set number have not been shot, the determination at Step S24 is "NO" and the process returns to Step S15.

In the case that images of the set number have been shot, the determination at Step S24 is "YES" and the process proceeds to Step S25.

At Step S25, the moving picture generation unit 60 generates a moving picture file based on a plurality of still images sequentially shot this time which are stored in the image storage unit 83. Then, the moving picture generation unit 60 allows the moving picture file to be stored in the image storage unit 83.

The, the sequential self-timer shooting process is ended.

Figure 8:
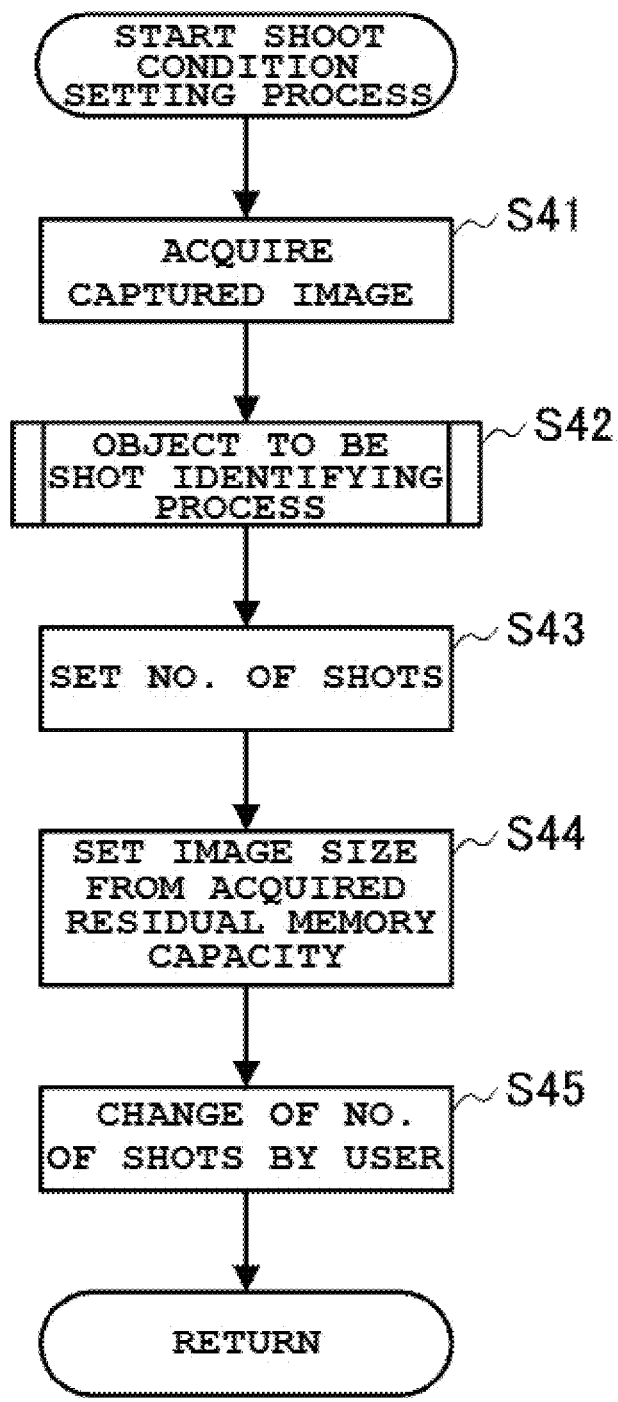
FIG. 8 is a flow chart for explaining a shoot condition setting process in the sequential self-timer shooting process.

FIG. 8 is a flow chart for explaining the shoot condition setting process in the sequential self-timer shooting process.

At Step S41, the shoot condition setting process unit 52 acquires captured images from the imaging unit 16.

At Step S42, the shoot condition setting process unit 52 executes an object to be shot identifying process as will be described below. As a result, the shoot condition setting process unit 52 determines the number of shots by referring to the subject table based on the result of detection of a subject in the captured images.

At Step S43, the shoot condition setting process unit 52 sets the number of shots based on the number determined by the object to be shot identifying process.

At Step S44, the shoot condition setting process unit 52 sets images size based on the acquired residual memory capacity. More specifically, the shoot condition setting process unit 52 sets the image size to a small value in the case that the residual memory capacity is small in consideration of a storage capacity necessary to store the number of images to be shot.

At Step S45, in the case that a change is requested by the user, the shoot condition setting process unit 52 changes the number of shots according to the user's request.

Figure 9:
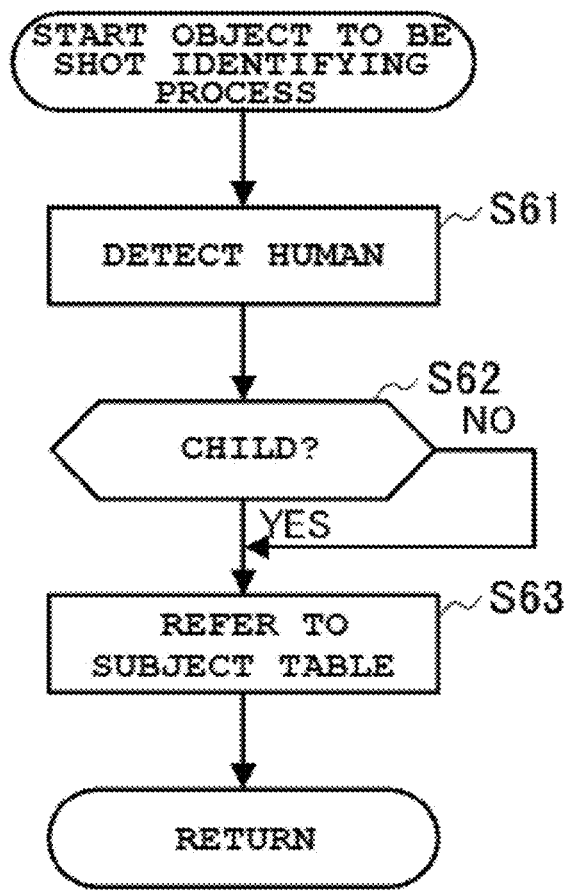
FIG. 9 is a flow chart for explaining an object to be shot identifying process in the shoot condition setting process.

FIG. 9 is a flow chart for explaining the object to be shot identifying process in the shoot condition setting process.

At Step S61, the shoot condition setting process unit 52 detects a human from the captured image by using a well-known human detection technology.

At Step S62, the shoot condition setting process unit 52 determines whether or not the detected subject is a child by using a well-known human image analysis technology.

In the case the subject is not a child, the determination at Step S62 is "NO" and the process proceeds to Step S63 based on the determination result.

In the case the subject is a child, the determination at Step S62 is "YES" and the process proceeds to Step S63 based on the determination result.

At Step S63, the shoot condition setting process unit 52 refers to the subject table. More specifically, the shoot condition setting process unit 52 determines the number of shots by referring to the subject table shown in FIG. 3 to find "No. of Shots" corresponding to the subject.

Figure 10:
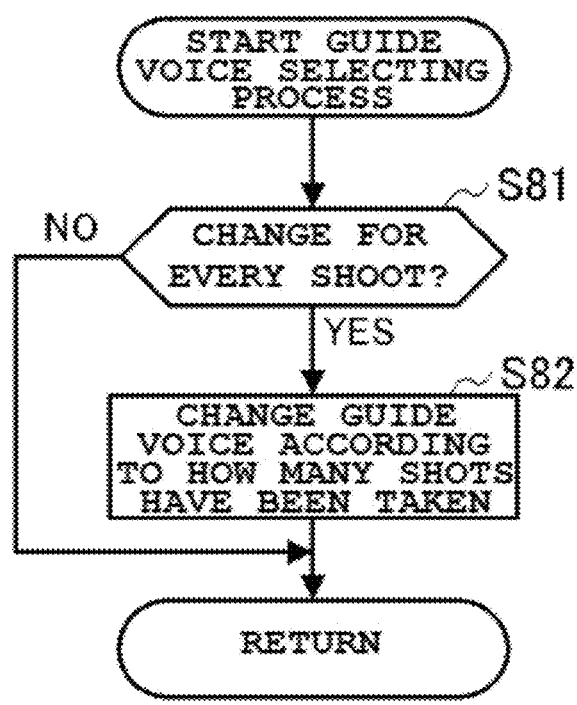
FIG. 10 is a flow chart for explaining a guide voice selecting process in the sequential self-timer shooting process.

FIG. 10 is a flow chart for explaining the guide voice selecting process in the sequential self-timer shooting process.

At Step S81, the guide voice selecting process unit 54 determines whether or not to change a guide voice for every shoot.

In the case of not changing a guide voice for every shoot, the determination at Step S81 is "NO" and the guide voice selecting process is ended.

In the case of changing a guide voice for every shoot, the determination at Step S81 is "YES" and the process proceeds to Step S82.

At Step S82, the guide voice selecting process unit 54 changes a guide voice according to how many shots have been taken by referring to the guide voice table shown in FIG. 5.

In the present embodiment, it is supposed that the user previously selects which guide voice will be used and/or which group of guide voices changed for every shoot will be used, prior to starting the sequential self-timer shooting process, and that the guide voice selecting process unit 54 executes the guide voice selecting process based on the previously selected guide voice or the previously selected group of guide voices.

Figure 11:
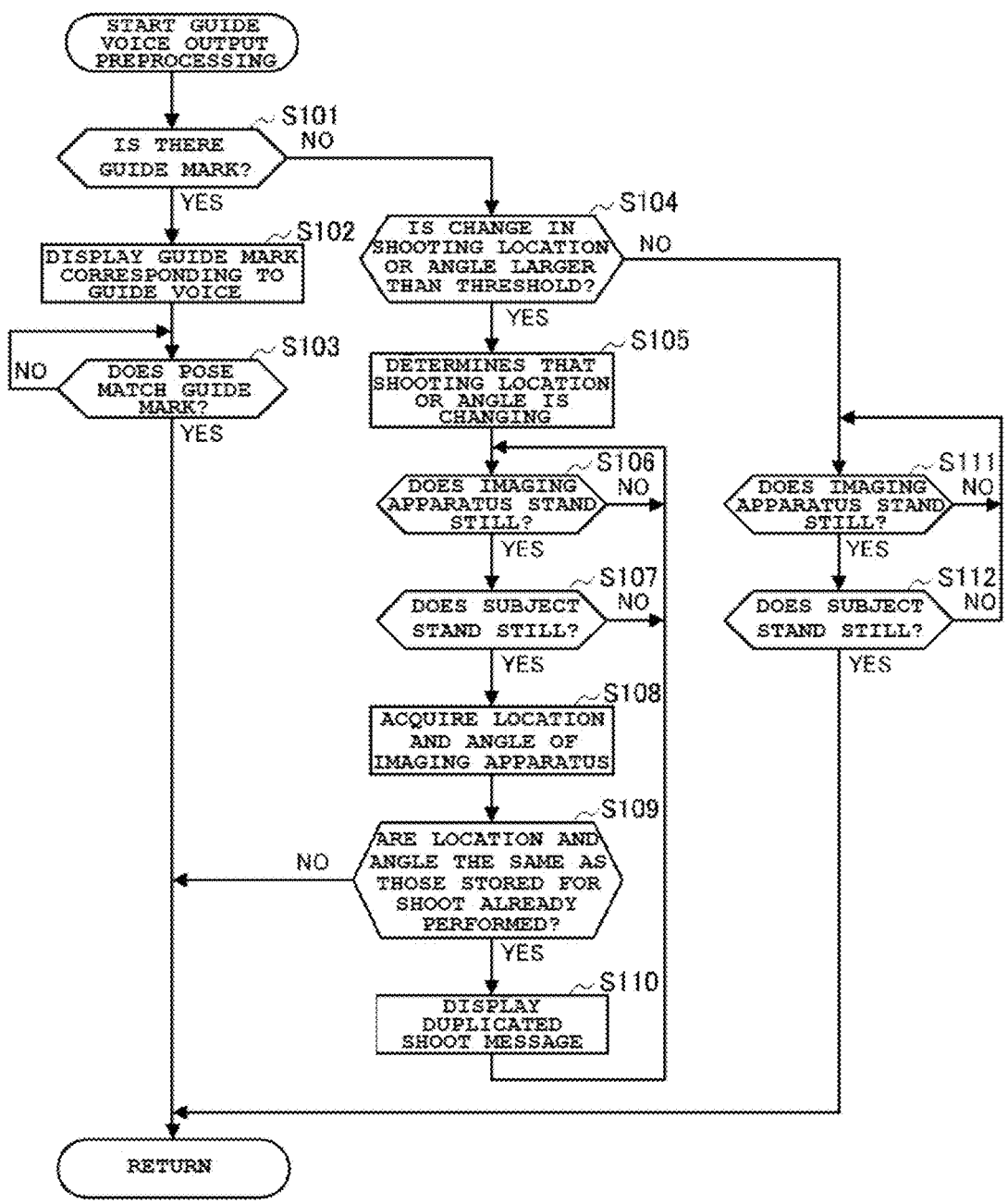
FIG. 11 is a flow chart for explaining a guide voice output preprocessing in the sequential self-timer shooting process.

FIG. 11 is a flow chart for explaining the guide voice output preprocessing in the sequential self-timer shooting process.

At Step S101, the guide voice output preprocessing unit 55 determines whether or not there is a guide mark.

In the case that there is a guide mark, the determination at Step S101 is "YES" and the processing proceeds to Step S102.

At Step S102, the guide voice output preprocessing unit 55 displays guide mark data corresponding to a guide voice.

At Step S103, the guide voice output preprocessing unit 55 determines whether or not a subject in a captured image matches the guide mark.

In the case that the subject does not match the guide mark, the determination at Step S103 is "NO" and the processing stands by until the subject matches the guide mark.

In the case that the subject matches the guide mark, the determination at Step S103 is "YES" and the guide voice output preprocessing is ended.

In the case that there is no guide mark, the determination at Step S101 is "NO" and the processing proceeds to Step S104.

At Step S104, the guide voice output preprocessing unit 55 determines whether or not a change in a shooting location or a shooting angle is larger than a threshold value.

In the case that the change in the shooting location or the shooting angle is larger than the threshold value, the determination at Step S104 is "YES" and the processing proceeds to Step S105.

At Step S105, the guide voice output preprocessing unit 55 determines that a shooting location or a shooting angle of the imaging apparatus 1 is changing.

At Step S106, the guide voice output preprocessing unit 55 determines whether or not the imaging apparatus 1 stands still.

In the case that the imaging apparatus 1 does not stand still, the determination at Step S106 is "NO" and the processing is in a state of stand-by.

In the case that the imaging apparatus 1 stands still, the determination at Step S106 is "YES" and the processing proceeds to Step S107.

At Step S107, the guide voice output preprocessing unit 55 determines whether or not the subject stands still.

In the case that the subject does not stand still, the determination at Step S107 is "NO" and the processing returns to Step S106.

In the case that the subject stands still, the determination at Step S107 is "YES" and the processing proceeds to Step S108.

At Step S108, the guide voice output preprocessing unit 55 acquires a location and an angle of the imaging apparatus 1.

At Step S109, the guide voice output preprocessing unit 55 determines whether or not the location and angle of the imaging apparatus 1 acquired at Step S108 is the same as those stored for a shoot already performed.

In the case that the location and angle is not the same as those stored for the shoot already performed, the determination at Step S109 is "NO" and the guide voice output preprocessing is ended.

In the case that the location and angle is the same as those stored for the shoot already performed, the determination at Step S109 is "YES" and the processing proceeds to Step S110.

At Step S110, the guide voice output preprocessing unit 55 displays a duplicated shoot message.

In the case that the change in the shooting location or the shooting angle is not larger than the threshold value, the determination at Step S104 is "NO" and the processing proceeds to Step S111.

At Step S111, the guide voice output preprocessing unit 55 determines whether or not the imaging apparatus 1 stands still.

In the case that the imaging apparatus 1 does not stand still, the determination at Step S111 is "NO" and the processing is in a state of stand-by.

In the case that the imaging apparatus 1 stands still, the determination at Step S111 is "YES" and the processing proceeds to Step S112.

At Step S112, the guide voice output preprocessing unit 55 determines whether or not the subject stands still.

In the case that the subject does not stand still, the determination at Step S112 is "NO" and the processing is in a state of stand-by.

In the case that the subject stands still, the determination at Step S112 is "YES" and the guide voice output preprocessing is ended.

In the present embodiment, it is supposed that the user selects whether or not to display a guide mark prior to starting the sequential self-timer shooting process and the guide voice output preprocessing unit 55 executes the guide voice output preprocessing based on the user's selection on whether or not to display a guide mark.

Figure 12:
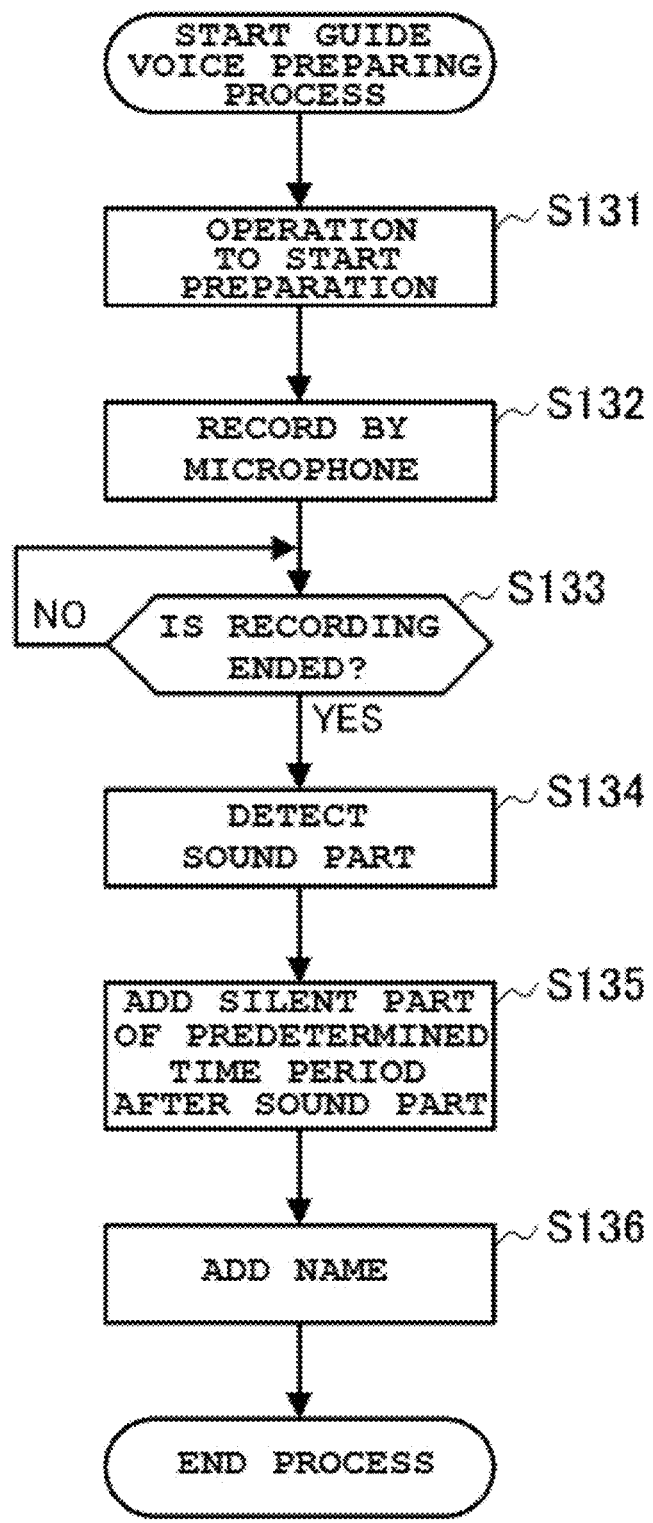
FIG. 12 is a flow chart for explaining a guide voice preparing process performed by the imaging apparatus of FIG. 1 including the functional configuration shown in FIG. 2.

FIG. 12 is a flow chart for explaining the guide voice preparing process performed by the imaging apparatus of FIG. 1 including the functional configuration shown in FIG. 2.

The guide voice preparing process is started by the user's operation of starting the guide voice preparing process input to the input unit 18.

At Step S131, the guide voice preparing process unit 61 detects whether or not an operation of starting preparation is input to the input unit 18.

At Step S132, the guide voice preparing process unit 61 starts recording by using a microphone included in the input unit 18.

At Step S133, the guide voice preparing process unit 61 determines whether or not to end the recording.

In the case of not ending the recording, the determination at Step S133 is "NO" and the recording continues.

In the case of ending the recording, the determination at Step S133 is "YES" and the process proceeds to Step S134.

At Step S134, the guide voice preparing process unit 61 detects sound parts in the recording.

At Step S135, the guide voice preparing process unit 61 makes voice data by adding a silent part of a predetermined length of time after the detected sound parts.

At Step S136, the guide voice preparing process unit 61 adds a name to the voice data by the user's operation input to the input unit 18.

Thus, according to the imaging apparatus 1 of the present embodiment, it is possible to realize sequential self-timer shooting without a time check function by playing back a voice file (voice guidance).

<Modification of Object to be Shot Identifying Process>

According to the object to be shot identifying process of the embodiment described above, the number of shots is determined according to whether the subject is a child, a human other than a child, or not a human.

A modified example of the object to be shot identifying process is configured to detect human(s), identify states of human(s) in the case that the human(s) are detected, and determine the number of shots according to the identified states of the human(s). In this example, the determination of the number of shots is performed by referring to a change rate table.

Further, this example is configured to extract contours of a subject and determine the number of shots according to the extracted contours in the case that the detected subject is not a human. In this example, the determination of the number of shots is performed by referring to a complexity table.

FIG. 13 shows the change rate table and the complexity table.

As shown in FIG. 13, the change rate table is a table used to determine the number of shots by doing the sum of additional points of the number of shots according to states of human(s). More specifically, human detection is performed and a temporal change rate is determined from states of the human(s) relative to an imaging screen. The larger the area of face(s) to that of a captured image is, the higher the additional point of the number of shots is. The additional point of the number of shots becomes higher in the order of the face, the upper body and the whole body of a human. Further, the higher the number of persons is, the higher the additional point of the number of shots is. The change rate table makes "RATIO OF AREA OF FACE TO AREA OF CAPTURED IMAGE [%]" (~r1·r1~r2·r2~), "PART OF HUMAN" (FACE·UPPER BODY·WHOLE BODY) and "NO. OF PERSONS" (ONE·TWO·THREE) correspond to additional points of the number of shots (1·2·3). The number of shots is determined from the total sum of additional points in each category of human states.

Next, as shown in FIG. 13, the complexity table is a table used to determine the number of shots by doing the sum of additional points of the number of shots according to states of a subject's contours in the case that no human is detected. In other word, in the case that no human is detected, determination of spatial complexity is performed by contour extraction. The additional point of the number of shots is higher in the case that a total sum of length of the contours is longer, the number of contours continuing for a predetermined length or longer is larger, or the ratio of contours having a predetermined or larger curvature is higher. More specifically, the complexity table makes "TOTAL SUM OF LENGTH OF CONTOURS [pixel]" (~s1·s1~s2·s2~), "NO. OF CONTOURS CONTINUING FOR LENGTH A OR LONGER [piece]" (~t1·t1~t2·t2~), and "RATIO OF CONTOURS OF WHICH CURVATURE IS B OR LARGER [%]" (~u1·u1~u2·u2~) correspond to additional points of the number of shots (1·2·3). The number of shots is determined from the total sum of additional points in each category of states of the subject's contours. Thus, for example, in the case that the subject has no change such as a vast sea, the number of shots is low.

Figure 14:
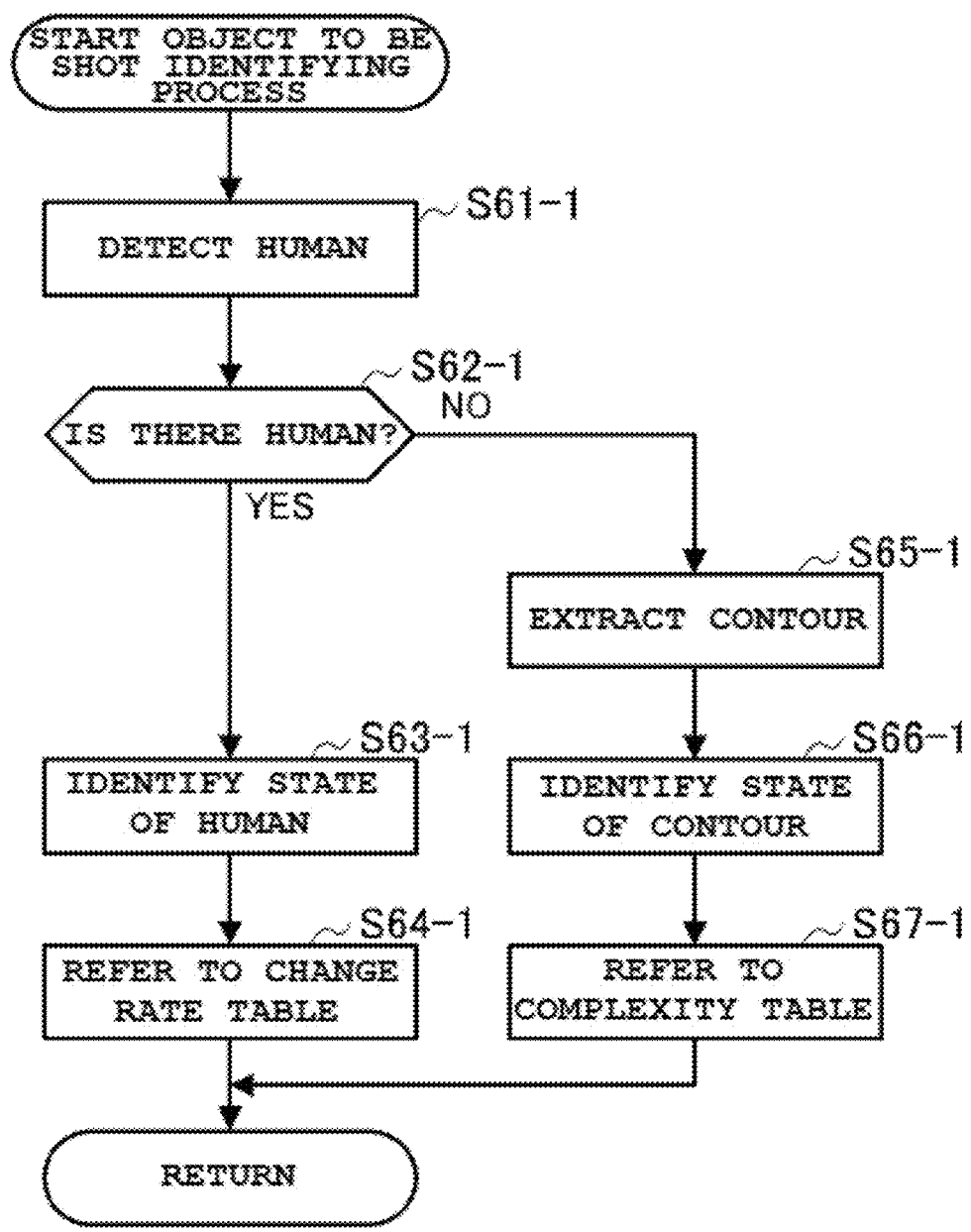
FIG. 14 is a flow chart for explaining a modification of the object to be shot identifying process in the shoot condition setting process.

FIG. 14 is a flow chart for explaining the modification of the object to be shot identifying process in the shoot condition setting process.

At Step S61-1, the shoot condition setting process unit 52 detects a human from a captured image by using a well-known human detection technology.

At Step S62-1, the shoot condition setting process unit 52 determines whether or not there is a human.

In the case that there is no human, the determination at Step S62-1 is "NO" and the process proceeds to Step S65-1.

In the case that there is a human, the determination at Step S62-1 is "YES" and the process proceeds to Step S63-1.

At Step S63-1, the shoot condition setting process unit 52 identifies states of the human by using a well-known human image analysis technology.

At Step S64-1, the shoot condition setting process unit 52 determines the number of shots by referring to the change rate table based on the identified state of the human. More specifically, the shoot condition setting process unit 52 determines the number of shots from the total sum of additional points according to the human's states by referring to the change rate table shown in FIG. 13.

At Step S65-1, the shoot condition setting process unit 52 extracts contours from a captured image by using a well-known contour extraction technology.

At Step S66-1, the shoot condition setting process unit 52 identifies states of the contours by using a well-known contour analysis technology.

At Step S67-1, the shoot condition setting process unit 52 determines the number of shots by referring to the complexity table based on the identified state of the contours. More specifically, the shoot condition setting process unit 52 determines the number of shots from the total sum of additional points according to states of a subject's contours by referring to the complexity table shown in FIG. 13.

<Modification of Guide Voice Selecting Process>

The guide voice selecting process of the embodiment described above is configured to determine whether to use one voice for all shoots or change a guide voice according to how many shots have been taken based on user settings.

A modified example of the guide voice selecting process is configured to identify a kind and/or a facial expression of a human (for example, man, woman, no smile, and the like) at the time of the first shoot and changes a guide voice selectively according to the identification result.

Here, it is supposed that the user selects whether to change a guide voice based on the identification result at the time of the first shoot prior to the sequential self-timer shooting process.

Figure 15:
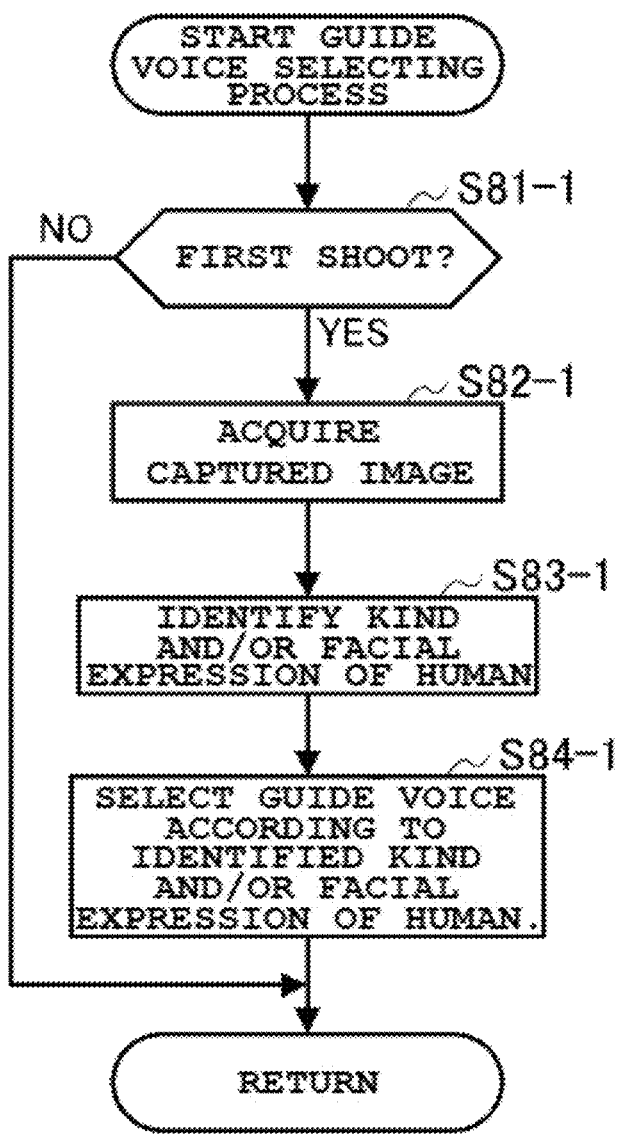
FIG. 15 is a flow chart for explaining a modification of the guide voice selecting process in the sequential self-timer shooting process.

FIG. 15 is a flow chart for explaining the modification of the guide voice selecting process in the sequential self-timer shooting process.

At Step S81-1, the guide voice selecting process unit 54 determines whether or not the present shoot is the first shoot.

In the case that the present shoot is not the first shoot, the determination at Step S81-1 is "NO" and the process is ended.

In the case that the present shoot is the first shoot, the determination at Step S81-1 is "YES" and the process proceeds to Step S82-1.

At Step S82-1, the guide voice selecting process unit 54 acquires a captured image from the imaging unit 16.

At Step S83-1, the guide voice selecting process unit 54 identifies a kind and/or a facial expression of a human from the captured image by using a well-known human detection technology and/or a well-known human image analysis technology.

At Step S84-1, the guide voice selecting process unit 54 selects a guide voice according to the identified kind and/or facial expression of the human.

<Another Modification of Guide Voice Selecting Process>

Another modified example of the guide voice selecting process is configured to identify a facial expression for every shoot and change a guide voice according to the identification result.

Here, it is supposed that the user selects whether to change a guide voice for every shoot prior to the sequential self-timer shooting process.

For example, a well-known technology is used to calculate the degree of smile from an image in which multiple parts of a face forming facial expressions such as the eyes or mouth widen. In the case that the degree of smile is 50% which is lower than a threshold value (80%) for the first shot, the guide voice is changed to "Big smile" for the next shoot. In the case that the degree of smile of the next shot is 65%, the guide voice is changed to "Smile bigger" for the next shoot. In the case that the degree of smile of the next shot is 85%, the guide voice is changed to "Make a different face" for the next shoot. On the other hand, in the case that the degree of smile is 90% which is higher than the threshold value (80%) for the first shot, the guide voice is changed to "Make a crying face" for the next shoot. As described above, the next guide voice is changed according to a facial expression of the previous shot.

Figure 16:
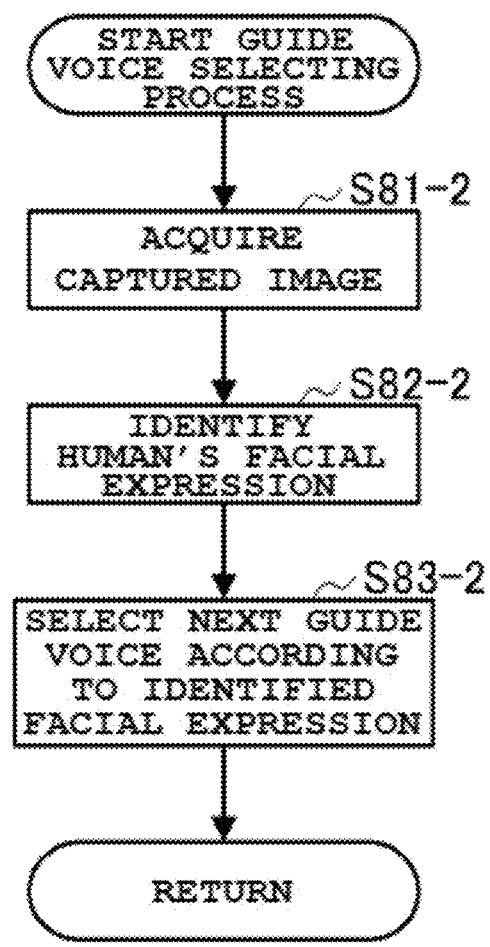
FIG. 16 is a flow chart for explaining another modification of the guide voice selecting process in the sequential self-timer shooting process.

FIG. 16 is a flow chart for explaining the modification of the guide voice selecting process in the sequential self-timer shooting process.

At Step S81-2, the guide voice selecting process unit 54 acquires a captured image from the imaging unit 16.

At Step S82-2, the guide voice selecting process unit 54 identifies a human's facial expression from the captured image by using a well-known human detection technology and/or a well-known human image analysis technology.

At Step S83-2, the guide voice selecting process unit 54 selects the next guide voice according to the identified facial expression as described above.

The imaging apparatus 1 configured as above can take shoots sequentially by self-timer and includes the output unit 19, the imaging unit 16, and the imaging control unit 57.

The output unit 19 plays back a first voice file including a voice of a predetermined playback time period for guidance to prepare for shooting.

The imaging unit 16 performs shooting one time after playback of the first voice file by the output unit 19 is ended.

The imaging control unit 57 repeats playback by the output unit 19 and shooting by the imaging unit 16 a predetermined number of times.

Thus, as the imaging apparatus 1 controls time of a self-timer by the playback time period of the first voice file, it does not have to use a time check function and can select a voice for shooting guidance such as "Three, two, one, okay!" or "Say cheese!" and a timer time at the same time only by selecting one voice file. As a result, it is possible to perform sequential self-timer shooting which provides convenience and efficiency at the same time.

The predetermined playback time period is set so as to correspond to intervals of self-timer shoots sequentially performed.

By this, the imaging apparatus 1 can play back a guide voice for every shoot of the self-timer shooting.

According to certain embodiments of the invention, a plurality kinds of first voice files are prepared.

The output unit 19 is controlled to select and play back one of the plurality of kinds of first voice files according to a predetermined criterion.

By this, the imaging apparatus 1 can enhance freedom in setting a voice file.

In one embodiment, the plurality kinds of first voice files have different playback time periods.

By this, the imaging apparatus 1 of the present embodiment can enhance freedom in setting a voice file.

In one embodiment, the plurality kinds of first voice files have different contents.

By this, the imaging apparatus 1 of the present embodiment can enhance freedom in setting a voice file.

The predetermined criterion is based on the number of shoots and depends on how many shoots have been done before this shoot.

By this, the imaging apparatus 1 can enhance freedom in setting a voice file.

In one embodiment, the predetermined criterion is based on analysis contents acquired by analyzing an image taken by the previous shoot.

By this, the imaging apparatus 1 can play back a voice file conforming to a state of shooting.

In one embodiment, the output unit 19 can be controlled to play back a second voice file for informing of start of shooting, for example, saying "Start!" prior to the first playback of the first voice file.

By this, the imaging apparatus 1 can perform sequential self-timer shooting which provides convenience and efficiency at the same time.

In one embodiment, the output unit 19 can be controlled to play back a third voice file for informing of end of shooting, for example, saying "Okay!" after finishing shoots of a predetermined number.

By this, the imaging apparatus 1 can perform sequential self-timer shooting which provides convenience and efficiency at the same time.

Further, in the case that a plurality of still images are taken by the imaging unit 16, the imaging apparatus 1 includes the moving picture generation unit 60 for generating one moving picture by using the plurality of still images.

By this, the imaging apparatus 1 can generates a moving picture by using still images sequentially taken.

Further, in certain embodiments, the imaging apparatus 1 further includes the voice preparing means 61 for making a voice file by collecting a voice.

The first voice file may be made by the user.

By this, the imaging apparatus 1 can enhance freedom in setting a voice file.

The voice preparing means 61 detects sound parts from the collected voice and adds a silent part of a predetermined time period after the detected sound parts to make the first voice file.

By this, the imaging apparatus 1 can prevent a shot from being taken immediately after the sound is cut off before the user is prepared for shooting.

Further, the present invention is not limited to the embodiments described above and any modifications or alternatives which can achieve the objects of the invention fall within the scope of the invention.

In the above described embodiment, the shoot condition setting process may further identify a scene and consider the result when determining complexity. Further, the complexity may be determined by further considering chromatic number, luminance difference or the like. The complexity may be determined for animals such as pets other than humans. Further, the number of shots and image size may be previously set to fixed values. In the case that a residual memory capacity is insufficient for the set number of shots, a compression rate may be changed to secure a capacity for the number of shots. Further, in the case a sufficient residual memory capacity cannot be secured for the set number of shots, the shooting may be ended after taking images of the number which can be stored by the residual memory capacity.

Further, in the guide voice selecting process of the above described embodiment, the guide voice can be set to a fixed predetermined voice.

Further, in the above described embodiment, the guide voice output preprocessing may identify a human's facial expression instead a location and an angle of the imaging apparatus and not allow shooting to be performed in the case the facial expression is similar to that of a previously taken image as measures against duplicated shots. Further, the guide mark may be a contour line.

In one embodiment, the guide voice output preprocessing and playback of a guide voice are performed in parallel and shooting is performed after waiting until the playback is ended even in the case that it is determined that a pose of the subject matches a guide mark before the playback is ended. In the case that it is not determined that a pose of the subject matches the guide mark at the time when the playback is ended, shooting may be performed after waiting until it is determined that a pose of the subject matches the guide mark.

In one embodiment, the guide voice output preprocessing and the playback of a guide voice are performed in parallel and shooting is performed after waiting until the playback is ended even in the case that it is determined that the imaging apparatus and the subject stand still before the playback is ended. In the case that it is not determined that the imaging apparatus and the subject stand still at the time when the playback is ended, shooting may be performed after waiting until it is determined that the imaging apparatus and the subject stand still.

According to an embodiment, numbers of shoots and scenes are stored in the shoot setting information storage unit 81 so that the scenes such as "child", "human other than child" and "other than human" correspond to the numbers of shoots and the number of shoots is set according to a scene selected by the user in the shoot condition setting process.

In the embodiment above described, the user may set a display time period of one still image and the duration and kind of effect between still images in the moving picture file generating process. Further, an animation effect (for example, zoom) may be applied to the still image which is being displayed, and, in this case, it is desirable to set the display time period of one still image to a relatively long time, for example, three seconds.

In the embodiment above described, the name may be automatically assigned according to a predetermined rule in the guide voice preparing process.

In the embodiment above described, the voice file may be modified to correspond to a language of a release country or a country specified by coordinates acquired by a GPS function in the guide voice preparing process.

Further, in the embodiments described above, the present invention has been applied to a digital camera as an example of the imaging apparatus 1 without limitation.

For example, the present invention can be applied to general electronic devices which can execute the self-timer shooting process and the guide voice preparing process. Specifically, the present invention can be applied to a notebook type personal computer, a printer, a television, a video camera, a portable navigation device, a mobile phone, a smart phone, a portable game device, and the like.

The sequence of the processes described above can be executed by hardware or software.

In other words, the functional configuration shown in FIG. 2 is merely an example and the present invention is not limited thereto. The imaging apparatus 1 suffices if it has a function for performing a sequence of the processes as a whole. Functional blocks to use to implement this function are not limited to the embodiment of FIG. 2.

In addition, a functional block may be configured by a piece of hardware, a piece of software, or their combination.

In the case that the sequence is performed by software, a program configuring the software is installed in a computer or the like from a network or a storage medium.

The computer may be a computer which is incorporated in dedicated hardware. In addition, the computer may be a computer capable of executing various functions by installing various programs therein, for example, a general-purpose personal computer.

A storage medium for recording such a program consists of not only the removable media 31 shown in FIG. 1 which is distributed separately from the apparatus's main body to provide it to users, but also a storage medium or the like which is provided to users in a state of being incorporated in the apparatus's main body in advance. The removable media 31 includes, for example, a magnetic disk (including a floppy disk), an optical disc, a magneto-optical disk, or the like. For example, the optical disc includes a compact disk-read only memory (CD-ROM), a digital versatile disk (DVD), a Blu-ray (Registered Trademark) disc, or the like. The magneto-optical disk includes a Mini-Disk (MD), or the like. In addition, the storage medium which is provided to the users in a state of being incorporated in the apparatus's main body in advance includes, for example, the ROM 12 in FIG. 1 in which a program is recorded, a hard disk included in the storage unit 20 in FIG. 1, or the like.

Further, in the description presented here, the steps describing a program recorded in a recording medium include not only processes to be executed serially in time in order, but also processes which are not necessarily executed serially in time but in a parallel manner or individually.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. An imaging apparatus comprising:
an output device;
an imaging device; and
a processor which executes a program stored in a memory to execute:
playback processing to control the output device to play back a first voice file of a predetermined playback time period one time, the first voice file including a voice providing guidance to prepare for shooting;
determining processing to determine whether the output device has played back the first voice file to completion one time; and
shooting processing to control the imaging device to perform shooting one time when the determining processing determines that the output device has played back the first voice file to completion one time, wherein:

the processor starts to execute the playback processing in response to input of a user's start operation to perform self-timer shooting, the processor executes the shooting processing when the first voice file has been played back to completion one time, without performing a time-check function, and the processor (i) executes the playback processing to control the output device to play back the first voice file one time again in response to the output device having played back the first voice file to completion one time, (ii) executes the determining processing to determine whether the output device has played back the first voice file to completion one time again, and (iii) executes the shooting processing to control the imaging device to perform shooting one time again when the determining processing determines that the output device has played back the first voice file to completion one time again.

2. The imaging apparatus of claim 1, further comprising a storage device configured to store a voice file according to contents of shooting in advance as the first voice file.

3. The imaging apparatus of claim 2, wherein the first voice file includes a voice for enabling a user to recognize a timing when shooting is performed.

4. The imaging apparatus of claim 1, further comprising a storage device configured to allow a voice file, including a voice, of any playback time period to be stored as the first voice file.

5. The imaging apparatus of claim 1, wherein the predetermined playback time period is set to correspond to a time interval of sequential shooting.

6. The imaging apparatus of claim 1, wherein a plurality of voice files are prepared, and the playback processing selects, as the first voice file, one of the plurality of voice files based on a predetermined criterion and controls the output device to play back the selected one of the voice files.

7. The imaging apparatus of claim 6, wherein the plurality of voice files have different playback time periods.

8. The imaging apparatus of claim 6, wherein the plurality of voice files have different voice contents.

9. The imaging apparatus of claim 6, wherein the predetermined criterion is based on a number of shots and the selection is made according to how many shots of the number of shots have been taken.

10. The imaging apparatus of claim 6, wherein the predetermined criterion is based on analysis of an image taken by a previous shot.

11. The imaging apparatus of claim 1, wherein the playback processing controls the output device to play back a second voice file for informing of a start of shooting prior to the playback of the first voice file.

12. The imaging apparatus of claim 1, wherein the playback processing controls the output device to play back a second voice file for informing of an end of shooting after shooting is performed the predetermined number of times.

13. The imaging apparatus of claim 1, wherein the processor further executes moving picture generating processing to generate a moving picture from a plurality of still images taken by the shooting processing.

14. The imaging apparatus of claim 1, wherein the processor further executes voice file preparing processing to collect a voice to prepare a voice file, wherein the first voice file can be made by a user through the voice file preparing processing.

15. The imaging apparatus of claim 14, wherein the voice file preparing processing makes the first voice file by detecting a sound part from the collected voice and adding a silent part of a predetermined time period after the detected sound part.

16. The imaging apparatus of claim 1, wherein the playback processing, the determining processing, and the shooting processing are repeated until the imaging device has performed shooting a predetermined number of times.

17. The imaging apparatus of claim 1, wherein the playback processing, the determining processing, and the shooting processing are repeated until the imaging device has performed shooting a predetermined number of times, in response to the input of the user's start operation to perform self-timer shooting having been performed once.

18. The imaging apparatus of claim 1, wherein the playback time period of the first voice file is a self-timer interval, and the processor executes the shooting processing to control the imaging device to perform self-timer shooting a predetermined number of times.

19. The imaging apparatus of claim 1, wherein the processor executes each playback processing to control the output device to play back the first voice file only one time regardless of a length of a time interval set by a timer.

20. An imaging method performed by a processor of an imaging apparatus, the imaging apparatus further comprising an output device and an imaging device, and the method comprising:

in response to input of a user's start operation to perform self-timer shooting, controlling the output device to play back a first voice file of a predetermined playback time period one time, the first voice file including a voice providing guidance to prepare for shooting;

determining whether the first voice file has been played back to completion one time;

controlling the imaging device to perform shooting one time when it is determined that the first voice file has been played back to completion one time, without performing a time-check function to perform self-timer shooting;

controlling the output device to play back the first voice file one time again in response to the output device having played back the first voice file to completion one time;

determining whether the first voice file has been played back to completion one time again; and controlling the imaging device to perform shooting one time again when it is determined that the first voice file has been played back to completion one time again.

21. A non-transitory computer-readable recording medium having a program stored thereon that is readable by a computer controlling an imaging apparatus to perform functions comprising:

in response to input of a user's start operation to perform self-timer shooting, controlling an output device to play back a first voice file of a predetermined playback time period one time, the first voice file including a voice providing guidance to prepare for shooting;

determining whether the first voice file has been played back to completion one time;

controlling an imaging device to perform shooting one time when it is determined that the first voice file has been played back to completion one time, without performing a time-check function to perform self-timer shooting;

controlling the output device to play back the first voice file one time again in response to the output device having played back the first voice file to completion one time;
determining whether the first voice file has been played back to completion one time again; and
controlling the imaging device to perform shooting one time again when it is determined that the first voice file has been played back to completion one time again.

\* \* \* \* \*